United States Patent
Chen

(10) Patent No.: US 12,093,205 B2
(45) Date of Patent: Sep. 17, 2024

(54) INTERFACE CONVERSION DEVICE

(71) Applicant: GENESYS LOGIC, INC., New Taipei (TW)

(72) Inventor: Wai-Ting Chen, New Taipei (TW)

(73) Assignee: GENESYS LOGIC, INC., New Taipei (TW)

(*) Notice: Subject to any disclaimer, the term of this patent is extended or adjusted under 35 U.S.C. 154(b) by 51 days.

(21) Appl. No.: 18/084,583

(22) Filed: Dec. 20, 2022

(65) Prior Publication Data
US 2024/0143538 A1 May 2, 2024

(30) Foreign Application Priority Data
Nov. 1, 2022 (TW) .................................. 111141478

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC .............................................. G06F 2213/0042
See application file for complete search history.

(56) References Cited

U.S. PATENT DOCUMENTS

| | | | |
|---|---|---|---|
| 2019/0166046 A1 | 5/2019 | Chandra et al. | |
| 2020/0257649 A1* | 8/2020 | Kabiry | G06F 13/4295 |
| 2020/0320026 A1 | 10/2020 | Kabiry et al. | |
| 2020/0382198 A1* | 12/2020 | Ashrafi | H04B 7/155 |
| 2021/0271620 A1* | 9/2021 | Lin | G06F 13/4282 |
| 2023/0088416 A1* | 3/2023 | Nelson | G06F 13/4282 710/313 |

FOREIGN PATENT DOCUMENTS

| | | |
|---|---|---|
| TW | 202134897 | 9/2021 |
| TW | M639691 | 4/2023 |

OTHER PUBLICATIONS

"Office Action of Taiwan Counterpart Application", issued on Apr. 11, 2023, p. 1-p. 9.
"Office Action of Taiwan Counterpart Application", issued on Nov. 9, 2023, p. 1-p. 4.

* cited by examiner

*Primary Examiner* — Henry Tsai
*Assistant Examiner* — Aurangzeb Hassan
(74) *Attorney, Agent, or Firm* — JCIPRNET

(57) ABSTRACT

The invention provides an interface conversion device including a USB connector, a DP connector, a first physical layer (PHY) circuit, a second PHY circuit, a digital buffer, a USB controller, and a path switching circuit. A first terminal of the first PHY circuit is coupled to the USB connector. The digital buffer and the USB controller are coupled to a second terminal of the first PHY circuit. A first terminal of the second PHY circuit is coupled to the DP connector. The path switching circuit selectively electrically connects a second terminal of the second PHY circuit to an output terminal of the digital buffer when the interface conversion device is operated in DP ALT mode. The path switching circuit selectively electrically connects the second terminal of the second PHY circuit to a DP output terminal of the USB controller when the interface conversion device is operated in tunneling mode.

16 Claims, 8 Drawing Sheets

INTERFACE CONVERSION DEVICE

CROSS-REFERENCE TO RELATED APPLICATION

This application claims the priority benefit of Taiwan application serial no. 111141478, filed on Nov. 1, 2022. The entirety of the above-mentioned patent application is hereby incorporated by reference herein and made a part of this specification.

BACKGROUND OF THE INVENTION

Field of the Invention

The invention relates to an electronic device, and more particularly, to an interface conversion device.

Description of Related Art

An interface conversion device may convert the first transmission interface of one equipment to the second transmission interface of another equipment. For example, the USB transmission interface (USB connector) of a Universal Serial Bus (USB) host may be electrically connected to the DP transmission interface (DP connector) of a Display Port (DP) device via the interface conversion device. Therefore, the interface conversion device may transmit the data over a USB Type-C connector of the USB host to the DP connector of the DP device. How to implement the interface conversion device is one of many technical issues in the art.

SUMMARY OF THE INVENTION

The invention provides an interface conversion device for transmitting data between different transmission interfaces.

In an embodiment of the invention, an interface conversion device includes a first Universal Serial Bus (USB) connector, a display port (DP) connector, a first physical layer circuit, a second physical layer circuit, a digital buffer, a USB controller, and a path switching circuit. A first terminal of the first physical layer circuit is coupled to the first USB connector. A first terminal of the second physical layer circuit is coupled to the DP connector. An output terminal of the digital buffer is coupled to a second terminal of the first physical layer circuit. The USB controller is coupled to the second terminal of the first physical layer circuit. A common terminal of the path switching circuit is coupled to a second terminal of the second physical layer circuit. A first selection terminal of the path switching circuit is coupled to the output terminal of the digital buffer. A second selection terminal of the path switching circuit is coupled to a DP output terminal of the USB controller. When an operation mode of the interface conversion device is a DP ALT mode, the path switching circuit is selectively configured to connect the common terminal with the first selection terminal electrically. When the operation mode of the interface conversion device is a tunneling mode, the path switching circuit is selectively configured to connect the common terminal with the second selection terminal electrically.

In an embodiment of the invention, the interface conversion device includes a USB connector, a DP connector, a digital buffer, a USB controller, a path switching circuit, an analog-to-digital conversion circuit, and a digital-to-analog conversion circuit. The analog-to-digital conversion circuit is coupled to the USB connector, the digital buffer, and the USB controller. The analog-to-digital conversion circuit converts a first analog data signal to first digital data, and outputs the first digital data to the digital buffer and the USB controller. A first selection terminal of the path switching circuit is coupled to an output terminal of the digital buffer. A second selection terminal of the path switching circuit is coupled to a DP output terminal of the USB controller. When an operation mode of the interface conversion device is a DP ALT mode, the path switching circuit is selectively configured to connect a common terminal of the path switching circuit with the first selection terminal electrically. When the operation mode of the interface conversion device is a tunneling mode, the path switching circuit is selectively configured to connect the common terminal with the second selection terminal electrically. The digital-to-analog conversion circuit is coupled to the path switching circuit and the DP connector. The digital-to-analog conversion circuit converts second digital data to a second analog data signal, and outputs the second analog data signal to the DP connector.

Based on the above, the interface conversion device of the embodiments of the invention may convert an analog domain signal to a digital domain signal to the digital buffer and the USB controller. Based on different operation modes of the interface conversion device, the interface conversion device may choose to convert the digital domain signal over the digital buffer or the USB controller to the analog domain signal to the DP connector. Therefore, the interface conversion device may transmit data between different transmission interfaces.

In order to make the aforementioned features and advantages of the disclosure more comprehensible, embodiments accompanied with figures are described in detail below.

DESCRIPTION OF THE EMBODIMENTS

Figure 1:
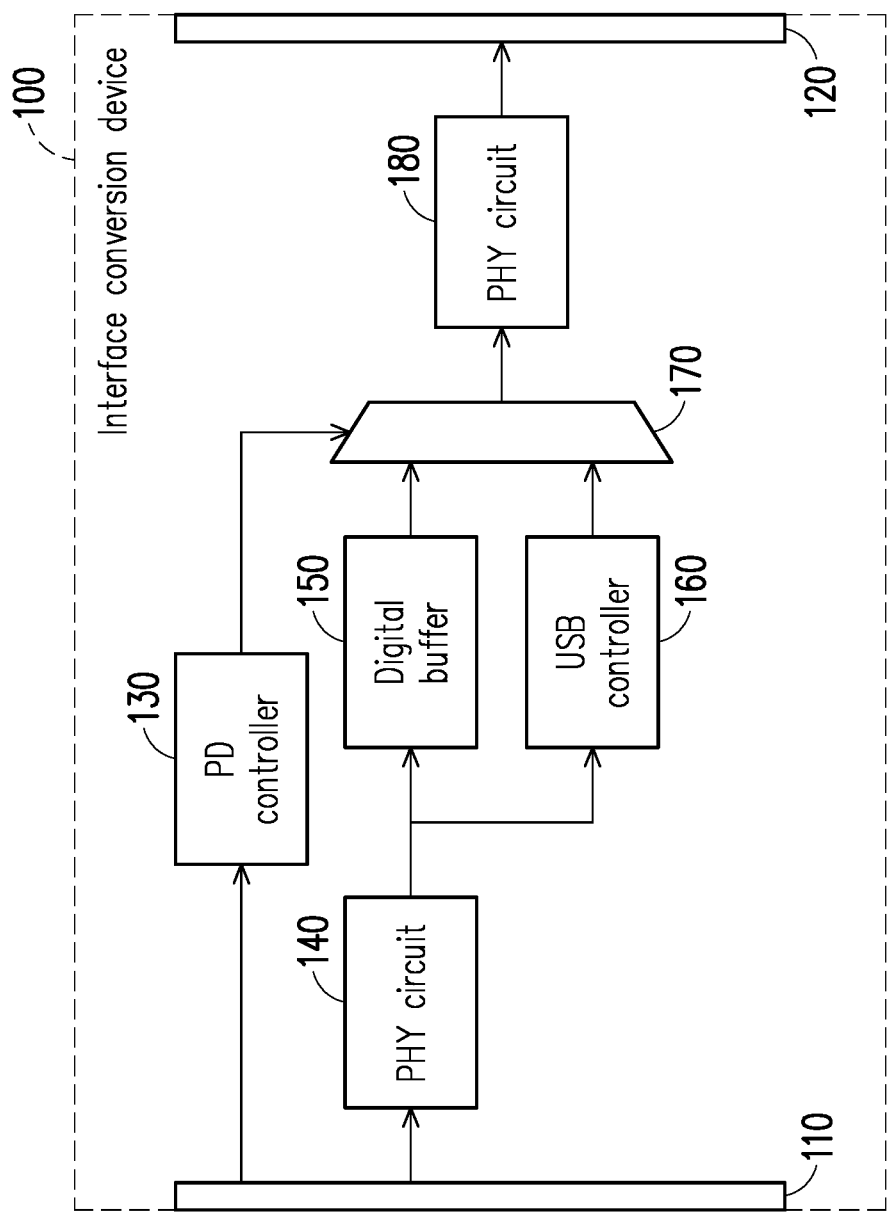
FIG. 1 is a circuit block diagram of an interface conversion device according to an embodiment of the invention.

The term "coupled to (or connected to)" used in the entire text of the specification of the present application (including claims) may refer to any direct or indirect connecting means. For example, if the text describes a first device is coupled to (or connected to) a second device, then it should be understood that the first device may be directly connected to the second device, or the first device may be indirectly connected to the second device via other devices or certain connecting means. Terms such as "first" and "second" mentioned in the entire specification of the present application (including the claims) are used to name the elements or to distinguish different embodiments or ranges, and are not used to restrict the upper or lower limits of the number of elements, nor are they used to limit the order of the elements. Moreover, when applicable, elements/members/steps having the same reference numerals in figures and embodiments represent the same or similar parts. Elements/members/steps having the same reference numerals or having the same terminology in different embodiments may be cross-referenced.

FIG. 1 is a circuit block diagram of an interface conversion device 100 according to an embodiment of the invention. The interface conversion device 100 shown in FIG. 1 includes a Universal Serial Bus (USB) connector 110, a display port (DP) connector 120, power delivery (PD) controller 130, a physical layer circuit 140, a digital buffer 150, a USB controller 160, a path switching circuit 170, and a physical layer circuit 180. The USB connector 110 may be a USB upstream-facing port (UFP) specified by the USB specification, and the DP connector 120 may be a downstream-facing port (DFP).

The PD controller 130 is coupled between a configuration channel (CC) pin of the USB connector 110 and the path switching circuit 170. The CC pin may include a CC1 pin and/or a CC2 pin specified by the USB specification. The PD controller 130 may exchange configuration information with a USB host (not shown) via the CC pin of the USB connector 110, and then determine the operation mode of the interface conversion device 100 according to the configuration information. Based on practical applications, the host may include a computer, a tablet computer, a mobile phone, or other electronic devices having a USB-C connector. The PD controller 130 may control the path switching operation of the path switching circuit 170 according to the operation mode.

The first terminal of the physical layer circuit 140 is coupled to the data transmission pin of the USB connector 110. For example, in the case where the USB connector 110 is a USB Type-C connector (also referred to as a USB-C connector), the physical layer circuit 140 may be coupled to four high-speed lanes of the USB-C connector specified by the USB specification: a transmitting (TX) pin pair TX1, a receiving (RX) pin pair RX1, a transmitting pin pair TX2, and a receiving pin pair RX2. The physical layer circuit 140 may convert the analog domain signal to a digital domain signal to the digital buffer 150 and the USB controller 160. Based on practical applications, the physical layer circuit 140 may include a USB physical layer circuit or other circuits specified by the USB specification. For example, in some embodiments, the physical layer circuit 140 may include a TX circuit and an RX circuit specified by the USB specification. In other embodiments, the physical layer circuit 140 may include an analog-to-digital conversion circuit and/or a digital-to-analog conversion circuit. The analog-to-digital conversion circuit (not shown) may convert the analog data signal to digital data, and output the digital data to the digital buffer 150 and the USB controller 160. The digital-to-analog converting circuit (not shown) may convert the digital data over the digital buffer 150 or the USB controller 160 to an analog data signal, and output the analog data signal to the USB connector 110.

The output terminal of the digital buffer 150 is coupled to the second terminal of the physical layer circuit 140. Based on actual design, the digital buffer 150 may include a first-in and first-out (FIFO) buffer or other digital buffer circuits. When the operation mode of the interface conversion device 100 is the DP alternative mode (hereinafter referred to as the DP ALT mode), the digital buffer 150 may compensate for clock jitter between the USB connector 110 and the DP connector 120.

The USB controller 160 is coupled to the second terminal of the physical layer circuit 140. Based on actual design, the USB controller 160 may include a USB controller and/or other USB signal processing circuits specified by the USB specification. For example, the USB controller 160 may include a link layer, a transport layer, and/or a protocol layer specified by the USB specification. When the operation mode of the interface conversion device 100 is the tunneling mode, the USB controller 160 may process the digital data over the second terminal of the physical layer circuit 140 to generate native DP data to the physical layer circuit 180. Based on practical applications, the tunneling mode may include a DP tunneling mode or other tunneling modes.

The first terminal of the physical layer circuit 180 is coupled to the data transmission pin of the DP connector 120. For example, the physical layer circuit 180 may be coupled to four main link lanes of the DP connector specified by the DP specification. The second terminal of the physical layer circuit 180 is coupled to the common terminal of the path switching circuit 170. The physical layer circuit 180 may convert the digital domain signal to an analog domain signal to the DP connector 120. Based on practical applications, the physical layer circuit 180 may include a USB physical layer circuit specified by the USB specification, a physical layer circuit specified by the DP specification, or other circuits. For example, in some embodiments, the physical layer circuit 180 may include a digital-to-analog conversion circuit. The digital-to-analog conversion circuit (not shown) may convert the digital data to an analog data signal, and output the analog data signal to the DP connector 120.

The first selection terminal of the path switching circuit 170 is coupled to the output terminal of the digital buffer 150. The second selection terminal of the path switching circuit 170 is coupled to the DP output terminal of the USB controller 160. When the operation mode of the interface conversion device 100 is the DP ALT mode, the path switching circuit 170 is selectively configured to connect the common terminal with the first selection terminal electrically, so as to transmit the native DP data output from the digital buffer 150 to the physical layer circuit 180. When the operation mode of the interface conversion device 100 is the tunneling mode, the path switching circuit 170 is selectively configured to connect the common terminal with the second selection terminal electrically, so as to transmit the native DP data output from the USB controller 160 to the physical layer circuit 180.

The specific implementation of the physical layer circuit 140 and the physical layer circuit 180 may be determined according to actual design. For example, in some embodiments, the circuit architecture of the physical layer circuit 140 is the same as the circuit architecture of the physical layer circuit 180. The physical layer circuit 140 and the physical layer circuit 180 may be general (or analog) physical layer circuits, so that the interfaces of the USB connector 110 and the DP connector 120 are almost symmetrical.

Based on the above, the interface conversion device 100 of an embodiment above may convert the analog domain signal to the digital domain signal (native DP data) to the digital buffer 150 and the USB controller 160. Based on different operation modes of the interface conversion device 100, the interface conversion device 100 may choose to convert the native DP data output from the digital buffer 150 to a DP analog domain signal to the DP connector 120, or choose to convert the native DP data over the USB controller 160 to a DP analog domain signal to the DP connector 120. Therefore, the interface conversion device 100 may transmit data between different transmission interfaces.

Figure 2:
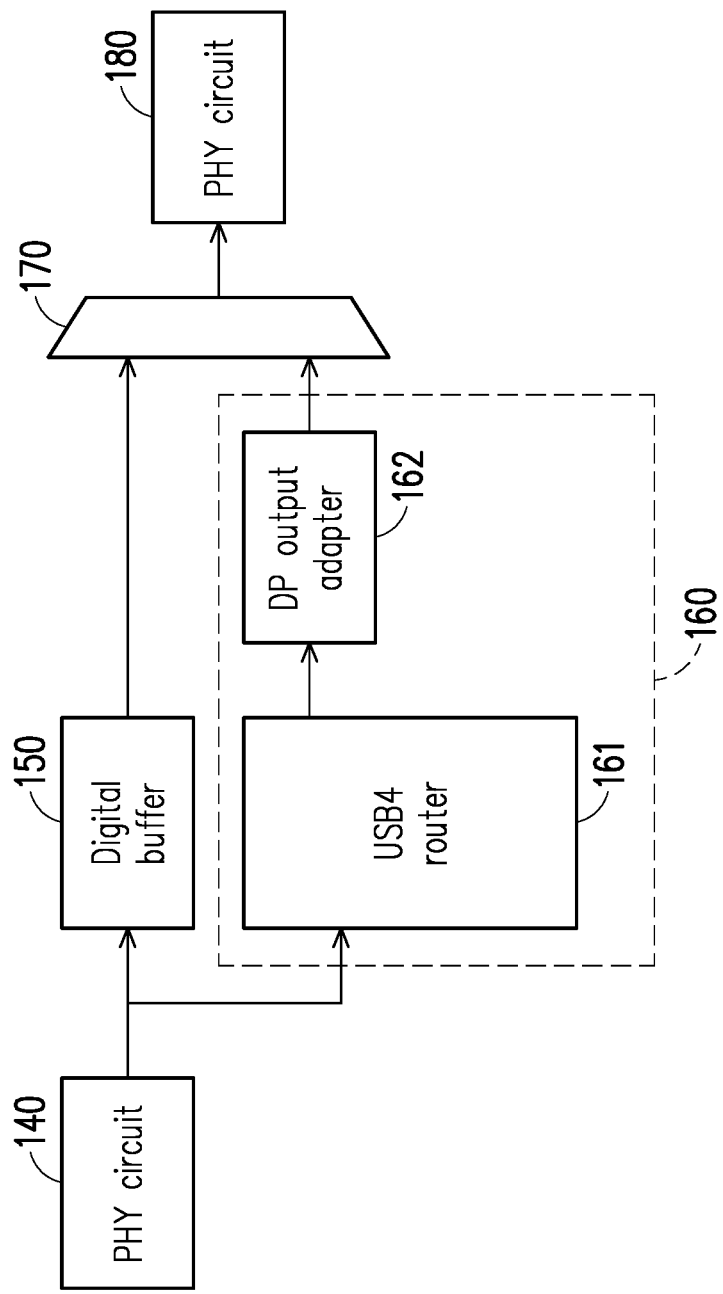
FIG. 2 is a schematic circuit block diagram of a USB controller shown according to an embodiment of the invention.

FIG. 2 is a schematic circuit block diagram of the USB controller 160 shown according to an embodiment of the invention. The USB controller 160 shown in FIG. 2 may be used as one of many implementation examples of the USB controller 160 shown in FIG. 1. In the embodiment shown in FIG. 2, the USB controller 160 includes a USB4 router 161 and a DP output adapter 162. The USB router 161 is coupled to the second terminal of the physical layer circuit 140. The USB4 router 161 may perform operations such as tunneling packets parsing, segmentation, routing, and so on. Based on actual design, the USB router 161 may include a USB controller and/or other USB signal processing circuits specified by the USB4 specification. For example, the USB4 router 161 may include a link layer and/or a transport layer specified by the USB4 specification.

The DP output adapter 162 is coupled to the USB4 router 161. The DP output adapter 162 may convert tunneling packets to native DP packets. Based on actual design, the DP output adapter 162 may include a DP adapter and/or other DP adapter circuits specified by the USB4 specification. The output terminal of the DP output adapter 162 is used as the DP output terminal of the USB controller 160 to be coupled to the second selection terminal of the path switching circuit 170.

Figure 3:
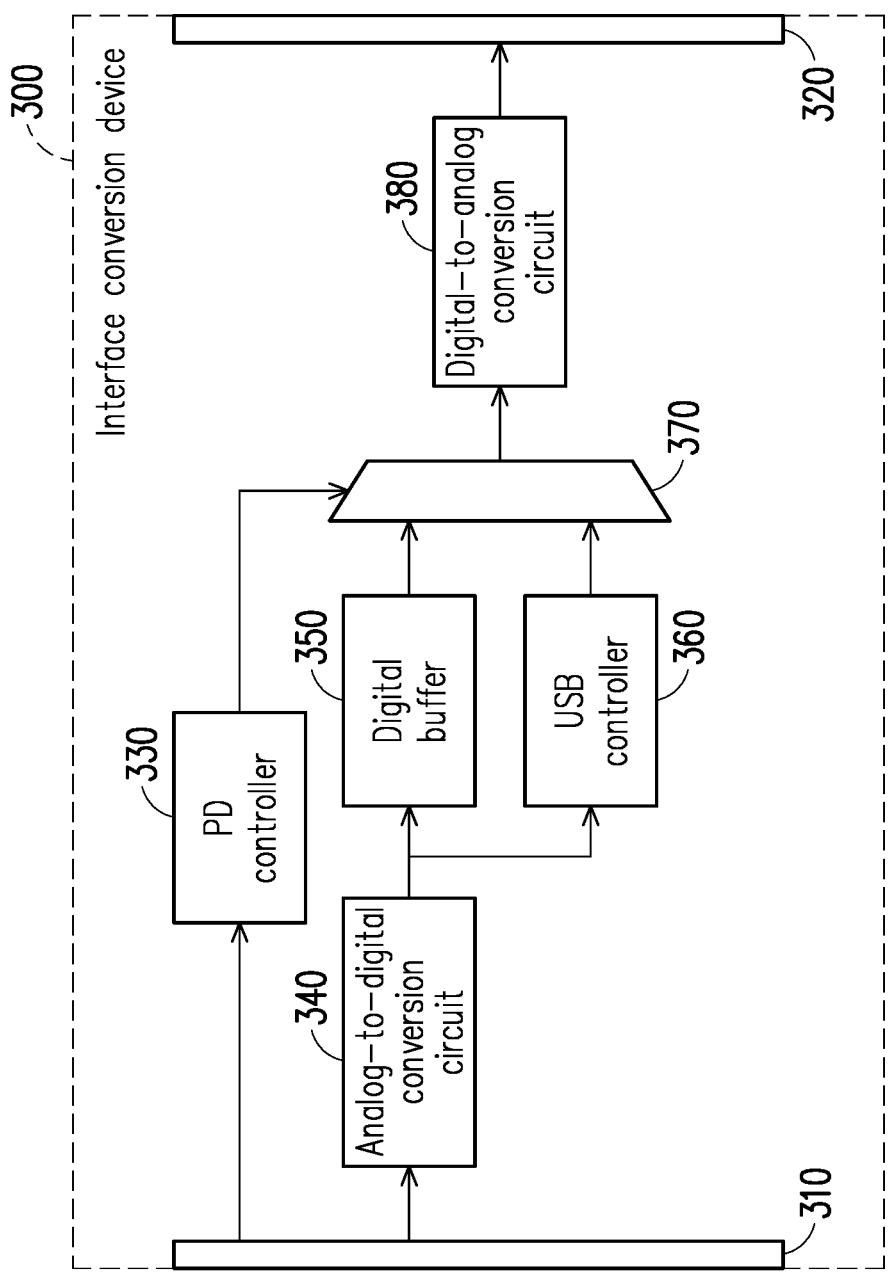
FIG. 3 is a circuit block diagram of an interface conversion device according to another embodiment of the invention.

FIG. 3 is a circuit block diagram of an interface conversion device 300 according to another embodiment of the invention. The interface conversion device 300 shown in FIG. 3 includes a USB connector 310, a DP connector 320, a PD controller 330, an analog-to-digital conversion circuit 340, a digital buffer 350, a USB controller 360, a path switching circuit 370, and a digital-to-analog conversion circuit 380. The interface conversion device 300, the USB connector 310, the DP connector 320, the PD controller 330, the digital buffer 350, the USB controller 360, and the path switching circuit 370 shown in FIG. 3 are as provided in the relevant descriptions of the interface conversion device 100, the USB connector 110, the DP connector 120, the PD controller 130, the digital buffer 150, the USB controller 160, and the path switching circuit 170 shown in FIG. 1 and are therefore not repeated herein. Based on actual design, in some embodiments, the USB controller 360 shown in FIG. 3 is as provided in the relevant description of the USB controller 160 shown in FIG. 2.

In the embodiment shown in FIG. 3, the analog-to-digital conversion circuit 340 is coupled to the USB connector 310, the digital buffer 350, and the USB controller 360. The analog-to-digital conversion circuit 340 may convert a first analog data signal to first digital data, and output the first digital data to the digital buffer 350 and the USB controller 360. The digital-to-analog conversion circuit 380 is coupled to the path switching circuit 370 and the DP connector 320. The digital-to-analog conversion circuit 380 may convert second digital data to a second analog data signal, and output the second analog data signal to the DP connector 320. When the operation mode of the interface conversion device 300 is the DP ALT mode, the path switching circuit 370 may be selectively configured to connect the common terminal of the path switching circuit 370 with the first selection terminal electrically, so as to transmit the native DP data output from the digital buffer 350 to the digital-to-analog conversion circuit 380. When the operation mode of the interface conversion device 300 is the tunneling mode, the path switching circuit 370 may be selectively configured to connect the common terminal with the second selection terminal electrically, so as to transmit the native DP data output from the USB controller 360 to the digital-to-analog conversion circuit 380.

Figure 4:
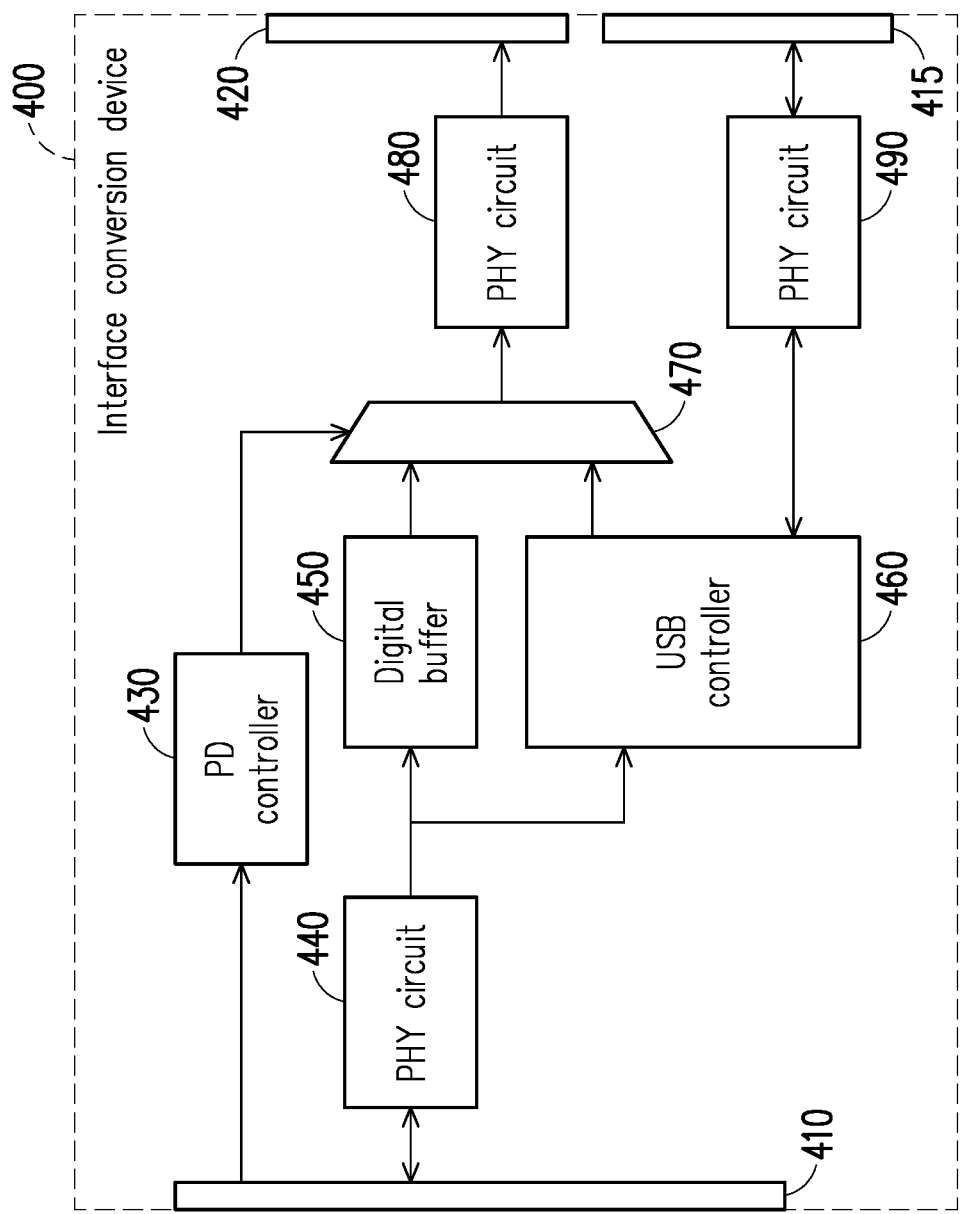
FIG. 4 is a circuit block diagram of an interface conversion device according to another embodiment of the invention.

FIG. 4 is a circuit block diagram of an interface conversion device 400 according to another embodiment of the invention. The interface conversion device 400 shown in FIG. 4 includes a USB connector 410, a USB connector 415, a DP connector 420, a PD controller 430, a physical layer circuit 440, a digital buffer 450, a USB controller 460, a path switching circuit 470, a physical layer circuit 480, and a physical layer circuit 490. The interface conversion device 400, the USB connector 410, the DP connector 420, the PD controller 430, the physical layer circuit 440, the digital buffer 450, the USB controller 460, the path switching circuit 470, and the physical layer circuit 480 shown in FIG. 4 are as provided in the relevant descriptions of the interface conversion device 100, the USB connector 110, the DP connector 120, the PD controller 130, the physical layer circuit 140, the digital buffer 150, the USB controller 160, the path switching circuit 170, and the physical layer circuit 180 shown in FIG. 1 and are therefore not repeated herein. In the embodiment shown in FIG. 4, the data transmission between the physical layer circuit 440 and the USB controller 460 may be bidirectional transmission.

In the embodiment shown in FIG. 4, the USB connector 410 may be a USB upstream-facing port (UFP) specified by the USB specification, and the USB connector 415 may be a USB downstream-facing port (DFP) specified by the USB specification. The first terminal of the physical layer circuit 490 is coupled to the USB connector 415. The second terminal of the physical layer circuit 490 is coupled to the USB downstream terminal of the USB controller 460. Based on practical applications, the physical layer circuit 490 may include a USB physical layer circuit or other circuits specified by the USB specification. For example, in some embodiments, the physical layer circuit 490 may include a TX circuit and an RX circuit specified by the USB specification. In other embodiments, the physical layer circuit 490 may include an analog-to-digital conversion circuit and/or a digital-to-analog conversion circuit. The specific implementation of the physical layer circuit 440, the physical layer circuit 480, and the physical layer circuit 490 may be determined according to actual design. For example, in some embodiments, the circuit architectures of the physical layer circuit 440, the physical layer circuit 480, and the physical layer circuit 490 are all the same. The physical layer circuits 440, 480, and 490 may be generic (or analog) physical layer circuits such that the interfaces of the USB connector 110 and the USB connector 415 are nearly symmetrical.

The PD controller 430 may exchange configuration information with a USB host (not shown) via the CC pin of the USB connector 410, and then determine the operation mode of the interface conversion device 400 according to the configuration information. In some embodiments, the operation mode (path switching) of the physical layer circuit 440, the physical layer circuit 480, and the physical layer circuit 490 may be controlled by the PD controller 430. In some other embodiments, the physical layer circuit 440, the physical layer circuit 480, and the physical layer circuit 490 may receive configuration information from the CC pin of the USB connector 410, so as to determine the operation mode of the physical layer circuits 440, 480, and 490 according to the configuration information.

Figure 5:
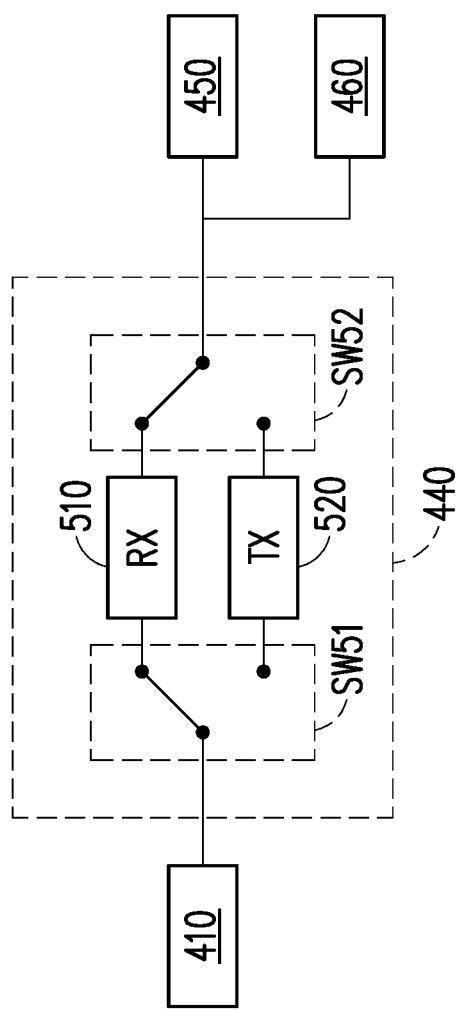
FIG. 5 and FIG. 6 are circuit block diagrams of a physical layer circuit shown according to an embodiment of the invention.

FIG. 5 is a circuit block diagram of the physical layer circuit 440 shown according to an embodiment of the invention. The physical layer circuit 440 shown in FIG. 5 includes a switch SW51, a receiver (RX) circuit 510, a transmitter (TX) circuit 520, and a switch SW52. The common terminal of the switch SW51 is coupled to the USB connector 410. The first selection terminal of the switch SW51 is coupled to the input terminal of the RX circuit 510. The second selection terminal of the switch SW51 is coupled to the output terminal of the TX circuit 520. The first selection terminal of the switch SW52 is coupled to the output terminal of the RX circuit 510. The second selection terminal of the switch SW52 is coupled to the input terminal of the TX circuit 520. The common terminal of the switch SW52 is coupled to the digital buffer 450 and the USB controller 460. In some embodiments, the operation mode (path switching) of the switch SW51 and the switch SW52 may be controlled by the PD controller 430. In some other embodiments, the switch SW51 and the switch SW52 may receive configuration information from the CC pin of the USB connector 410, and then determine the operation mode of the switches SW51 and SW52 according to the configuration information. Based on the configuration information of the CC pin, the switch SW51 may couple the USB connector 410 to the input terminal of the RX circuit 510, and the switch SW52 may couple the output terminal of the RX circuit 510 to the digital buffer 450 and the USB controller 460.

Figure 6:
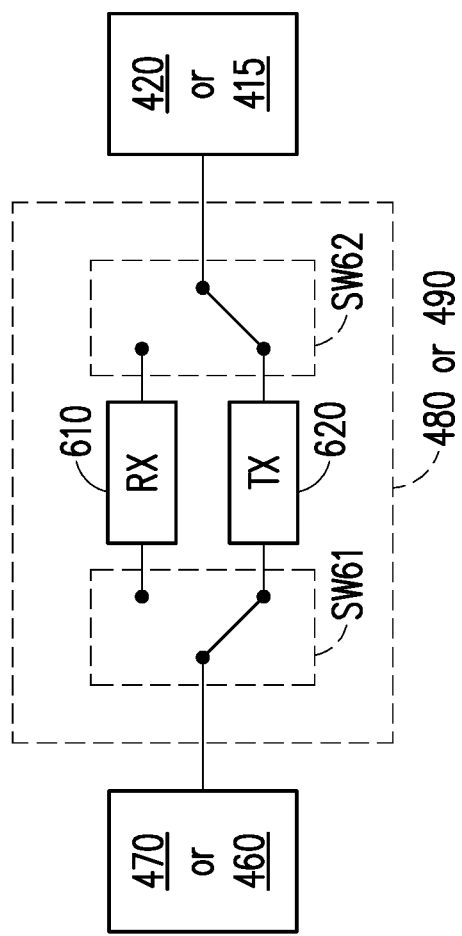

FIG. 6 is a circuit block diagram of the physical layer circuit 480 (or the physical layer circuit 490) shown according to an embodiment of the invention. The physical layer circuit 480 (or 490) shown in FIG. 6 includes a switch SW61, a receiver (RX) circuit 610, a transmitter (TX) circuit 620, and a switch SW62. The common terminal of the switch SW61 is coupled to the path switching circuit 470 (or the USB controller 460). The first selection terminal of the switch SW61 is coupled to the output terminal of the RX circuit 610. The second selection terminal of the switch SW61 is coupled to the input terminal of the TX circuit 620. The first selection terminal of the switch SW62 is coupled to the input terminal of the RX circuit 610. The second selection terminal of the switch SW62 is coupled to the output terminal of the TX circuit 620. The common terminal of the switch SW62 is coupled to the DP connector 420 (or the USB connector 415). In some embodiments, the operation mode (path switching) of the switch SW61 and the switch SW62 may be controlled by the PD controller 430. In some other embodiments, the switch SW61 and the switch SW62 may receive configuration information from the CC pin of the USB connector 410, and then determine the operation mode of the switches SW61 and SW62 according to the configuration information. Based on the configuration information of the CC pin, the switch SW61 may couple the path switching circuit 470 (or the USB controller 460) to the input terminal of the TX circuit 620, and the switch SW62 may couple the output terminal of the TX circuit 620 to the DP connector 420 (or the USB connector 415).

Figure 7:
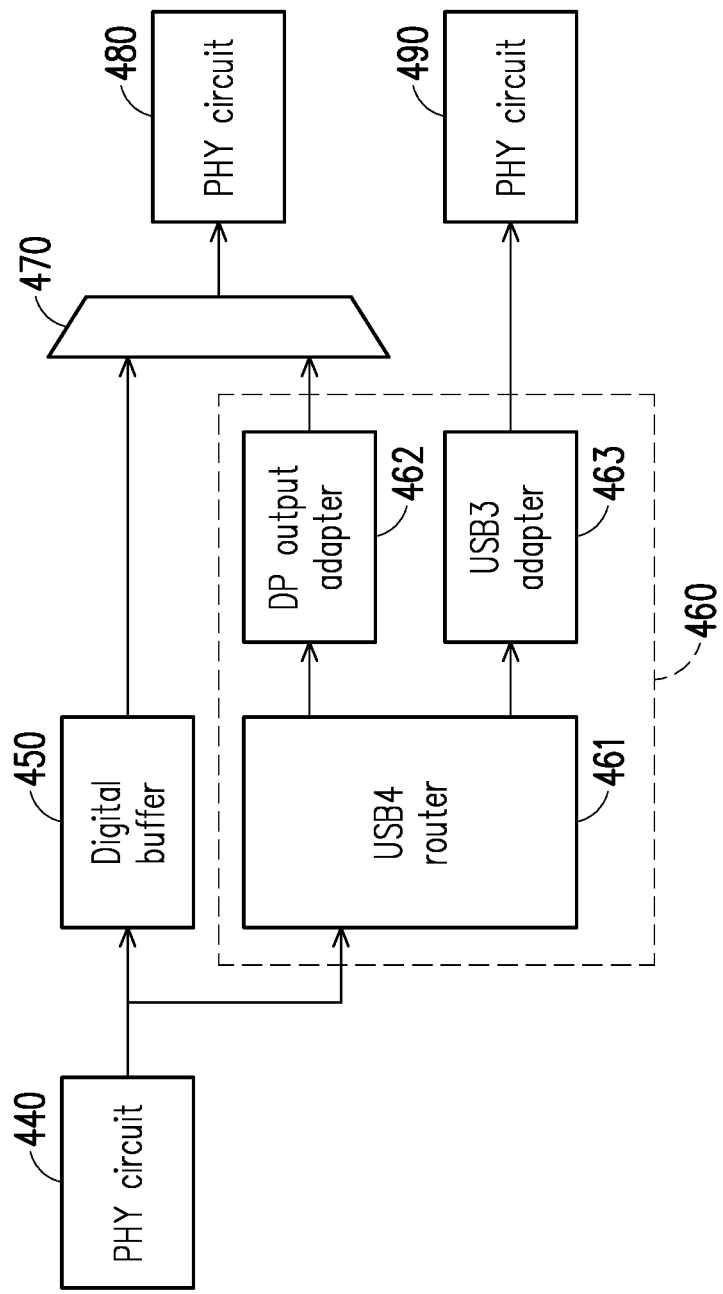
FIG. 7 is a schematic circuit block diagram of a USB controller shown according to an embodiment of the invention.

FIG. 7 is a schematic circuit block diagram of a USB controller 460 shown according to an embodiment of the invention. The USB controller 460 shown in FIG. 7 may be used as one of many implementation examples of the USB controller 460 shown in FIG. 4. In the embodiment shown in FIG. 7, the USB controller 460 includes a USB4 router 461, a DP output adapter 462, and a USB3 adapter 463. The USB4 router 461 and the DP output adapter 462 shown in FIG. 7 are as provided in the relevant descriptions of the USB4 router 161 and the DP output adapter 162 shown in FIG. 2, and are therefore not repeated herein. The first terminal of the USB3 adapter 463 shown in FIG. 7 is coupled to the USB4 router 461. The USB3 adapter 463 may convert USB tunneling packets to native USB packets. The second terminal of the USB3 adapter 463 is used as the USB downstream terminal of the USB controller 460 to be coupled to the second terminal of the physical layer circuit 490. Based on actual design, the USB3 adapter 463 may include a USB3 adapter and/or other USB adapter circuits specified by the USB4 specification.

When the operation mode of the interface conversion device 400 is the tunneling mode, the path switching circuit 470 may be selectively configured to connect the common terminal with the second selection terminal electrically, so as to transmit the native DP data output from the DP output adapter 462 to the physical layer circuit 480. Additionally, in another embodiment, the USB3 adapter 463 may output native USB3 data to the physical layer circuit 490 in the tunneling mode. When the operation mode of the interface conversion device 400 is the DP ALT mode and the pin assignment mode is "Pin assignment C or E", the path switching circuit 470 may be selectively configured to transmit the native DP data over the four high-speed lanes output from the digital buffer 450 to the digital-to-analog conversion circuit 480. When the operation mode of the interface conversion device 400 is the DP ALT mode and the pin assignment mode is "Pin assignment D", the path switching circuit 470 may be selectively configured to transmit the native DP data output from the digital buffer 450 (the DP data over the two high-speed lanes of the USB connector 410) to the digital-to-analog conversion circuit 480. Moreover, the USB3 adapter 463 may output native USB3 data (USB data over the other two high-speed lanes of the USB connector 410) to the physical layer circuit 490.

Figure 8:
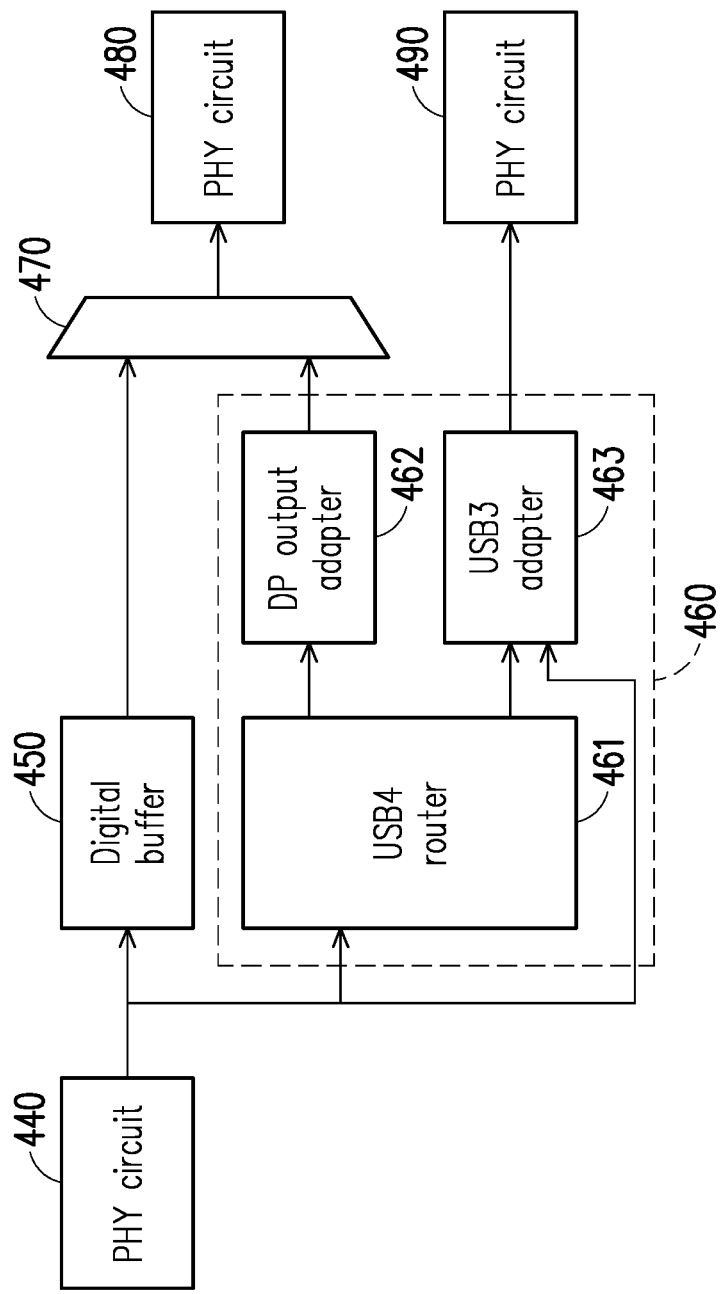
FIG. 8 is a schematic circuit block diagram of a USB controller shown according to another embodiment of the invention.

FIG. 8 is a schematic circuit block diagram of the USB controller 460 shown according to another embodiment of the invention. The USB controller 460 shown in FIG. 8 may be used as one of many implementation examples of the USB controller 460 shown in FIG. 4. In the embodiment shown in FIG. 8, the USB controller 460 includes the USB4 router 461, the DP output adapter 462, and the USB3 adapter 463. The USB4 router 461, the DP output adapter 462, and the USB3 adapter 463 shown in FIG. 8 are as provided in the relevant descriptions of the USB4 router 461, the DP output adapter 462, and the USB3 adapter 463 shown in FIG. 7 and are therefore not repeated herein. In the embodiment shown in FIG. 8, when the operation mode of the interface conversion device 400 is the DP ALT mode and the pin assignment mode is "Pin assignment D", the data over the 1-pair USB high-speed lane of the physical layer circuit 440 may bypass the USB4 router 461 and go directly to the USB3 adapter 463.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:
1. An interface conversion device, comprising:
a first Universal Serial Bus (USB) connector;
a DisplayPort (DP) connector;
a first physical layer circuit having a first terminal coupled to the first USB connector;
a second physical layer circuit having a first terminal coupled to the DP connector;
a digital buffer having an input terminal coupled to a second terminal of the first physical layer circuit;

a USB controller coupled to the second terminal of the first physical layer circuit;

a path switching circuit having a common terminal coupled to a second terminal of the second physical layer circuit, wherein a first selection terminal of the path switching circuit is coupled to an output terminal of the digital buffer, and a second selection terminal of the path switching circuit is coupled to a DP output terminal of the USB controller; and a power delivery controller coupled between a configuration channel pin of the first USB connector and the path switching circuit, wherein the power delivery controller exchanges configuration information with a USB host via the configuration channel pin to determine the operation mode of the interface conversion device, and the power delivery controller controls a path switching operation of the path switching circuit according to the operation mode, wherein when an operation mode of the interface conversion device is a DP ALT mode, the path switching circuit is selectively configured to connect the common terminal with the first selection terminal electrically, wherein when the operation mode of the interface conversion device is a tunneling mode, the path switching circuit is selectively configured to connect the common terminal with the second selection terminal electrically.

2. The interface conversion device of claim 1, wherein the first USB connector is an upstream-facing port, and the DP connector is a downstream-facing port.

3. The interface conversion device of claim 1, wherein the digital buffer comprises a first-in and first-out buffer.

4. The interface conversion device of claim 1, wherein a circuit architecture of the first physical layer circuit is the same as a circuit architecture of the second physical layer circuit.

5. The interface conversion device of claim 1, wherein the first physical layer circuit comprises an analog-to-digital conversion circuit for converting an analog data signal to a digital data, and outputting the digital data to the digital buffer and the USB controller.

6. The interface conversion device of claim 1, wherein the second physical layer circuit comprises a digital-to-analog conversion circuit for converting digital data to an analog data signal, and outputting the analog data signal to the DP connector.

7. The interface conversion device of claim 1, wherein the USB controller comprises:

a USB4 router coupled to the second terminal of the first physical layer circuit; and a DP output adapter coupled to the USB4 router, wherein an output terminal of the DP output adapter is used as the DP output terminal of the USB controller to be coupled to the second selection terminal of the path switching circuit.

8. The interface conversion device of claim 1, further comprising:

a second USB connector; and a third physical layer circuit having a first terminal coupled to the second USB connector, wherein a second terminal of the third physical layer circuit is coupled to a USB downstream terminal of the USB controller.

9. The interface conversion device of claim 8, wherein the first USB connector is an upstream-facing port, and the second USB connector is a downstream-facing port.

10. The interface conversion device of claim 8, wherein circuit architectures of the first physical layer circuit, the second physical layer circuit, and the third physical layer circuit are all the same.

11. The interface conversion device of claim 8, wherein the USB controller comprises:

a USB4 router coupled to the second terminal of the first physical layer circuit;

a DP output adapter coupled to the USB4 router, wherein an output terminal of the DP output adapter is used as the DP output terminal of the USB controller to be coupled to the second selection terminal of the path switching circuit; and a USB3 adapter having a first terminal coupled to the USB4 router, wherein a second terminal of the USB3 adapter is used as the USB downstream terminal of the USB controller to be coupled to the second terminal of the third physical layer circuit.

12. An interface conversion device, comprising:

a Universal Serial Bus (USB) connector;

a digital buffer;

a USB controller;

an analog-to-digital conversion circuit coupled to the USB connector, the digital buffer, and the USB controller, wherein the analog-to-digital conversion circuit converts a first analog data signal to first digital data, and the analog-to-digital conversion circuit outputs the first digital data to the digital buffer and the USB controller;

a DisplayPort (DP) connector;

a path switching circuit, wherein a first selection terminal of the path switching circuit is coupled to an output terminal of the digital buffer, and a second selection terminal of the path switching circuit is coupled to a DP output terminal of the USB controller, when an operation mode of the interface conversion device is a DP ALT mode, the path switching circuit is selectively configured to connect a common terminal of the path switching circuit with the first selection terminal electrically, and when the operation mode of the interface conversion device is a tunneling mode, the path switching circuit is selectively configured to connect the common terminal with the second selection terminal electrically;

a digital-to-analog conversion circuit coupled to the path switching circuit and the DP connector, wherein the digital-to-analog conversion circuit converts second digital data to a second analog data signal, and the digital-to-analog conversion circuit outputs the second analog data signal to the DP connector; and a power delivery controller coupled between a configuration channel pin of the USB connector and the path switching circuit, wherein the power delivery controller exchanges configuration information with a USB host via the configuration channel pin to determine the operation mode of the interface conversion device, and the power delivery controller controls a path switching operation of the path switching circuit according to the operation mode.

13. The interface conversion device of claim 12, wherein the USB connector is an upstream-facing port, and the DP connector is a downstream-facing port.

14. The interface conversion device of claim 12, wherein the digital buffer comprises a first-in and first-out buffer.

15. The interface conversion device of claim 12, wherein the USB controller comprises:

a USB4 router coupled to an output terminal of the analog-to-digital conversion circuit to receive the first digital data; and a DP output adapter coupled to the USB4 router, wherein an output terminal of the DP output adapter is used as the DP output terminal of the USB controller to be coupled to the second selection terminal of the path switching circuit.

16. The interface conversion device of claim 12, wherein the USB controller comprises:

a USB4 router coupled to the analog-to-digital conversion circuit; and a DP output adapter coupled to the USB4 router, wherein an output terminal of the DP output adapter is used as the DP output terminal of the USB controller to be coupled to the second selection terminal of the path switching circuit.

* * * * *